(12) United States Patent
Ueki et al.

(10) Patent No.: US 11,656,189 B2
(45) Date of Patent: May 23, 2023

(54) X-RAY INSPECTION DEVICE, MANAGEMENT SERVER FOR X-RAY INSPECTION DEVICE, AND MANAGEMENT METHOD FOR X-RAY INSPECTION DEVICE

(71) Applicant: Shimadzu Corporation, Kyoto (JP)

(72) Inventors: Futoshi Ueki, Kyoto (JP); Bunta Matsuhana, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/400,342

(22) Filed: Aug. 12, 2021

(65) Prior Publication Data

US 2022/0155244 A1 May 19, 2022

(30) Foreign Application Priority Data

Nov. 18, 2020 (JP) .............................. JP2020-192075

(51) Int. Cl.
*G01N 23/046* (2018.01)
*G01N 23/083* (2018.01)

(52) U.S. Cl.
CPC ......... *G01N 23/083* (2013.01); *G01N 23/046* (2013.01); *G01N 2223/04* (2013.01); *G01N 2223/3306* (2013.01); *G01N 2223/419* (2013.01)

(58) Field of Classification Search
CPC ............... G01N 23/083; G01N 23/046; G01N 2223/04; G01N 2223/3306; G01N 2223/419
See application file for complete search history.

(56) References Cited

U.S. PATENT DOCUMENTS

| 2005/0117700 A1* | 6/2005 | Peschmann | G01V 5/00 378/57 |
| 2005/0254619 A1 | 11/2005 | Kamegawa | |
| 2007/0200566 A1* | 8/2007 | Clark | G01V 5/0008 324/318 |
| 2021/0293728 A1* | 9/2021 | Evans | G01V 5/0041 |

FOREIGN PATENT DOCUMENTS

JP 2005-351879 A 12/2005

\* cited by examiner

*Primary Examiner* — David P Porta
*Assistant Examiner* — Mamadou Faye
(74) *Attorney, Agent, or Firm* — Maier & Maier, PLLC

(57) ABSTRACT

An X-ray inspection device includes a casing including an entrance of an object to be inspected, and a door for opening and closing the entrance; an X-ray detector accommodated inside the casing, and configured to detect a stage on which the object is placed, an X-ray source configured to emit an X-ray, and the X-ray that has been emitted from the X-ray source and transmitted through the object placed on the stage; and a driving system including a moving mechanism of the stage; a communication unit connectable with a communication network; a data acquisition unit configured to acquire consumption determination data including at least one of data indicating an operating situation of the driving system or data indicating the number of times of opening and closing the door; and a data transmission unit configured to output the consumption determination data that has been acquired by the data acquisition unit to the communication network via the communication unit.

10 Claims, 3 Drawing Sheets

X-RAY INSPECTION DEVICE, MANAGEMENT SERVER FOR X-RAY INSPECTION DEVICE, AND MANAGEMENT METHOD FOR X-RAY INSPECTION DEVICE

TECHNICAL FIELD

The present invention relates to an X-ray inspection device, a management server for the X-ray inspection device, and a management method for an X-ray inspection device.

BACKGROUND ART

An X-ray inspection device has a configuration in which a stage on which an object to be inspected is placed, an X-ray source that irradiates the object with an X-ray, and an X-ray detector that detects the X-ray that has been emitted from the X-ray source and transmitted through the object are accommodated in a casing.

For example, an industrial X-ray CT device is one type of the X-ray inspection devices, and is used for non-destructively observing internal structures of various products and measuring three-dimensional shapes. It includes an X-ray source and an X-ray detector that are mutually oppositely arranged, and a rotating stage disposed between the X-ray source and the X-ray detector. An object to be inspected such as an industrial product is placed on the rotating stage, and the rotating stage is rotated about a rotational axis perpendicular to the placement surface, while the object is irradiated with X-rays to collect X-ray projection data from the X-ray detector. By reconstructing a tomographic image of the object using the collected X-ray projection data, the internal structure of the object can be three-dimensionally observed (see Patent Literature 1). In addition, an X-ray fluoroscopic device which observes the internal structure of an object to be inspected through fluoroscopy without rotating the object is also used.

CITATION LIST

Patent Literature

Patent Literature 1: JP 2005-351879 A

SUMMARY OF INVENTION

Technical Problem

In such X-ray inspection devices, it is desirable to design the device taking an actual situation of use into consideration. In addition, it is necessary to replace component parts of the device, and perform maintenance at timings depending on the situation of use.

The present invention has been made to solve the above-described problems, and intends to accurately grasp a situation of use of each unit of an X-ray inspection device.

Solution to Problem

An X-ray inspection device according one aspect of the present invention that has been made to solve the above-described problems, the X-ray inspection device including:

a casing including an entrance of an object to be inspected, and a door for opening and closing the entrance;

a stage on which the object is placed, an X-ray source configured to emit an X-ray, and an X-ray detector configured to detect the X-ray that has been emitted from the X-ray source and transmitted through the object placed on the stage, the stage, the X-ray source, and the X-ray detector being accommodated inside the casing;

a driving system including a moving mechanism of the stage;

a communication unit connectable with a communication network;

a data acquisition unit configured to acquire consumption determination data including at least one of data indicating an operating situation of the driving system or data indicating the number of times of opening and closing the door; and a data transmission unit configured to output the consumption determination data that has been acquired by the data acquisition unit to the communication network via the communication unit.

Further, a management server for managing the X-ray inspection device according to one aspect of the present invention, the management server includes:

a server communication unit connectable with a communication network; and a data reception unit configured to receive, via the server communication unit, consumption determination data transmitted from the X-ray inspection device through the communication network.

Further, a management method for managing the X-ray inspection device according to one aspect of the present invention is a management method for managing a situation of the X-ray inspection device, using a management server connected with a communication network, the management method comprising:

requesting from the management server to the X-ray inspection device for a transmission of consumption determination data through the communication network; and receiving the consumption determination data transmitted from the X-ray inspection device to the management server through the communication network.

Advantageous Effects of Invention

According to the above-described aspect of the present invention, the management server connected with the X-ray inspection device through the communication network can grasp an operating situation of the driving system of the X-ray inspection device or the number of times of opening and closing of the door provided in the casing, based on the consumption determination data transmitted from the X-ray inspection device. Therefore, a component part can be replaced, or a maintenance can be performed at an appropriate timing according to the situation of use of the X-ray inspection device. In addition, information obtained from the consumption determination data can be used for designing the X-ray inspection device.

BRIEF DESCRIPTION OF DRAWINGS

FIG. 3 is a schematic diagram illustrating an internal configuration of the casing together with a control system and the like.

DESCRIPTION OF EMBODIMENTS

Figure 1:
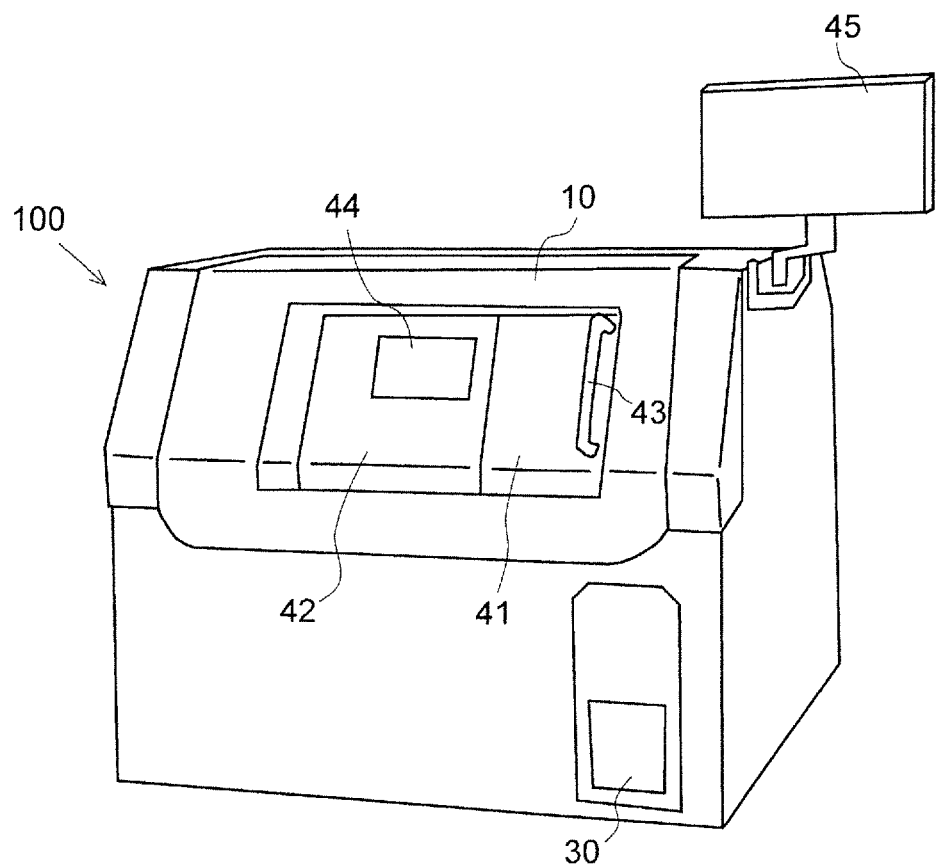
FIG. 1 is a perspective view of an X-ray CT device that is an embodiment of an X-ray inspection device according to the present invention.

Regarding the X-ray inspection device, in general, a maintenance and inspection timing and a replacement timing of each component part are determined in advance.

For example, in a case of a door that opens and closes an entrance for loading and unloading a workpiece, which is an object to be inspected, into and from a casing, the timings of maintenance and inspection of the door and replacement of component parts of the door are determined, based on the number of times of opening and closing the door. The durability of the door and the structure of the door are designed in accordance with the opening and closing frequency of the door (for example, the number of times of opening and closing per day). Usually, assuming that the number of workpieces to be inspected in one day by a single X-ray inspection device corresponds to the number of times of opening and closing the door in one day, the number of times of opening and closing the door in a certain period is estimated by multiplying the number of workpieces by the number of operation days of the X-ray inspection device in the certain period.

However, in order to change the orientation of the workpiece loaded into the casing, the door is opened and closed regardless of the loading and unloading of the workpiece, in some cases.

Hence, the number of times of opening and closing the door does not always correspond to the number of workpieces. For this reason, at the time of the door design, component parts of materials and shapes with sufficient durability for ensuring safety are selected. In addition, the maintenance and inspection are performed frequently more than necessary, in many cases. However, it is impossible to know the actual number of times of opening and closing the door.

Therefore, in reality, the number of operation times with a margin is estimated in consideration of safety.

For example, in an X-ray inspection device including a moving mechanism that moves the stage in X-Y-Z-O direction, the maintenance and inspection timing of the moving mechanism, the replacement timing of the component parts, and the like are set assuming that the standard operation is performed such that the stage is moved in any direction equally. However, depending on the customer, the stage may be frequently moved only in some directions of the moving mechanism, the stage may be moved at a higher speed than usual, or movements called hunting in which the stage is repeatedly reciprocated within a narrow range may be performed. Such non-standard actions affect the life of each component part of the moving mechanism. However, in the conventional X-ray inspection device, information regarding the operating situation of the moving mechanism has not been accumulated.

The X-ray inspection device according to the present invention has been made to address the above-described problems.

Hereinafter, an X-ray CT device in an embodiment of an X-ray inspection device according to the present invention will be specifically described with reference to the drawings.

FIG. 1 is a perspective view of an X-ray CT device. The X-ray CT device is also referred to as a non-destructive inspection device, and performs computed tomography (CT) imaging using X-rays. The X-ray CT device includes a device main body 100, a casing 10 provided in an upper half part of the device main body 100, a control device 30 provided in a lower right part of the device main body 100, and an operation panel 45 attached to an upper part of a right side surface of the device main body 100. The operation panel 45 includes, for example, a liquid crystal display into which a touch pad is incorporated, and also serves as a display screen.

Figure 2:
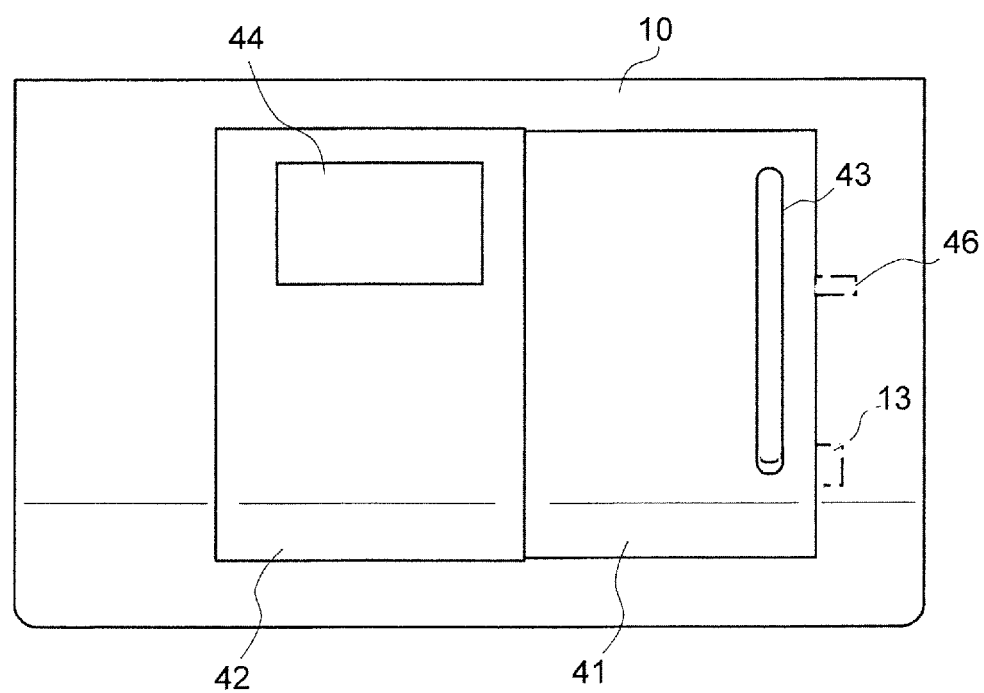
FIG. 2 is a front view of the vicinity of a casing of the X-ray CT device.

The casing 10 is formed of a member (an X-ray non-transmissive member) that does not transmit the X-rays. As illustrated in FIGS. 1 and 2, the casing 10 includes a front surface provided with an entrance for loading and unloading a workpiece that is an object to be inspected, and includes doors 41 and 42 that open and close the entrance. The doors 41 and 42 are coupled so as to move in conjunction with each other. A handle 43 is attached to the door 41. The door 42 is formed with a window part 44, to which lead glass capable of blocking the X-rays, is attached. The inside of the casing 10 can be observed through the window part 44. A shock absorber 46 that absorbs an impact when the doors 41 and 42 are vigorously closed, and a microswitch 13 for detecting an action of opening and closing the doors 41 and 42 are attached to the vicinity of the entrance, for example, at a right edge part of the entrance, of the casing 10. In the present embodiment, the microswitch is adopted as a unit for detecting the action of opening and closing the doors 41 and 42.

However, instead of the microswitch, a proximity sensor such as a reed switch or a photosensor may be used. The microswitch 13 will be described later in detail.

Figure 3:
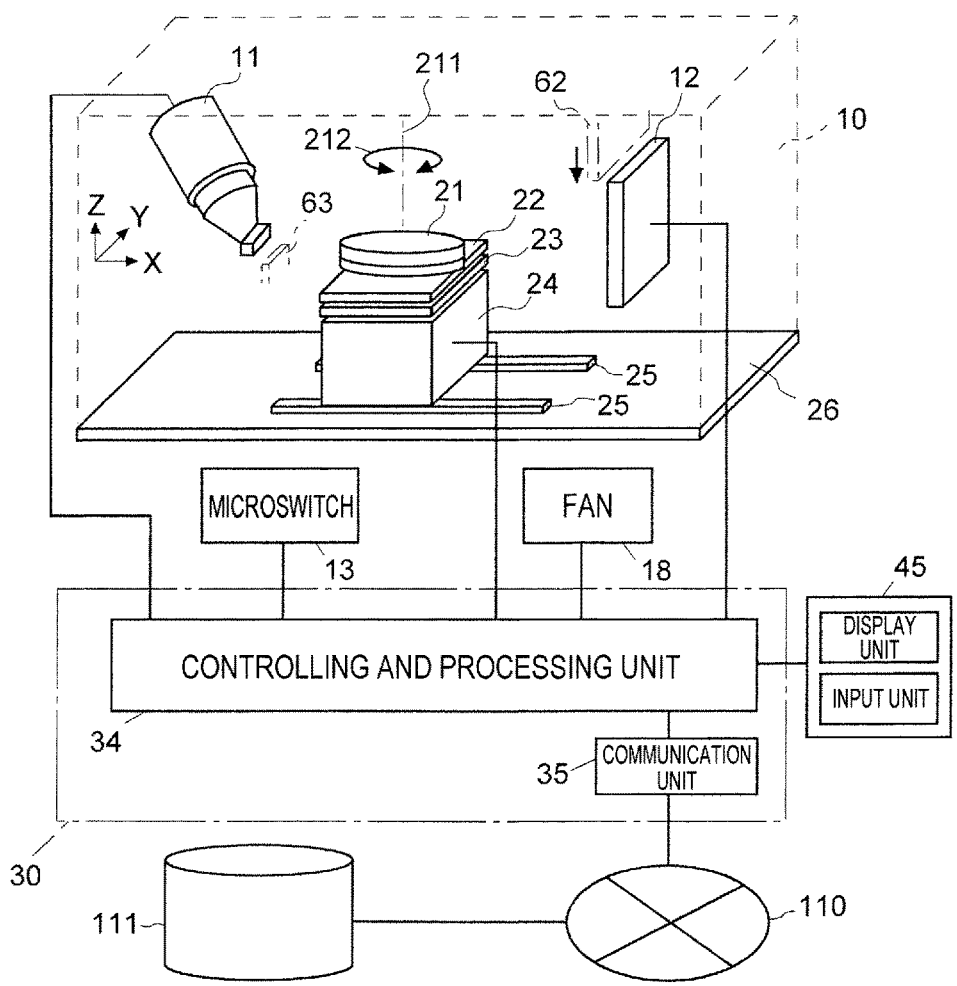

As illustrated in FIG. 3, an X-ray source 11, an X-ray detector 12, and a moving mechanism 20 are disposed inside the casing 10. The X-ray source 11 includes an X-ray tube that emits the X-rays in a conical shape, for example. The X-ray detector 12 is disposed opposite the X-ray source 11, and detects the X-ray that has been emitted from the X-ray source 11 and transmitted through the object to be inspected placed on the stage. The moving mechanism 20 is installed on a surface plate 26 disposed at the bottom part in the casing 10, and rotates and vertically moves a rotating stage 21 positioned between the X-ray source 11 and the X-ray detector 12. A workpiece is placed on the rotating stage 21.

The upper surface of the surface plate 26 is a flat surface, and the device main body 100 is installed such that the upper surface is a horizontal surface. In the following description, two directions parallel to the upper surface of the surface plate 26 and perpendicular to each other are referred to as X direction and Y direction, and a direction perpendicular to X direction and Y direction (that is, a vertical direction) is referred to as Z direction.

The moving mechanism 20 includes a pair of guide rails 25 disposed on the surface plate 26, a base 24 that moves along the guide rails 25, an X stage 23 that moves in X direction and a Y stage 22 that moves in Y direction, which are disposed on the base 24, and motors 51 to 55 (see FIG. 5) that respectively move the base 24, the X stage 23, the Y stage 22, and the rotating stage 21.

The motor (a motor for the base) 51 is provided on the base 24, and moves the base 24 along the guide rails 25. The motor 52 is provided on the X stage 23, and moves the X stage 23 in X direction. The motor 53 is provided on the Y stage 22, and moves the Y stage 22 in Y direction. The motor 54 is provided on the Y stage 22, and rotates the rotating stage 21 about a rotational axis 211 of Z direction in a direction indicated by a reference numeral 212. The motor 55 is provided on the base 24, and integrally moves the X stage 23, the Y stage 22, and the rotating stage 21 in Z direction (the vertical direction) with respect to the base 24.

The rotating stage 21 moves in X direction, Y direction, and Z direction, and rotates about the rotational axis 211, and therefore, an irradiation position of the X-ray that has been emitted from the X-ray source 11 toward the workpiece placed on the rotating stage 21 moves. In addition, the base 24 moves along the guide rails 25, and therefore, the distance between the X-ray source 11 and the rotating stage 21 changes.

As a result, the magnification ratio of a projection image of the workpiece detected by the X-ray detector 12 is changed.

Figure 4:
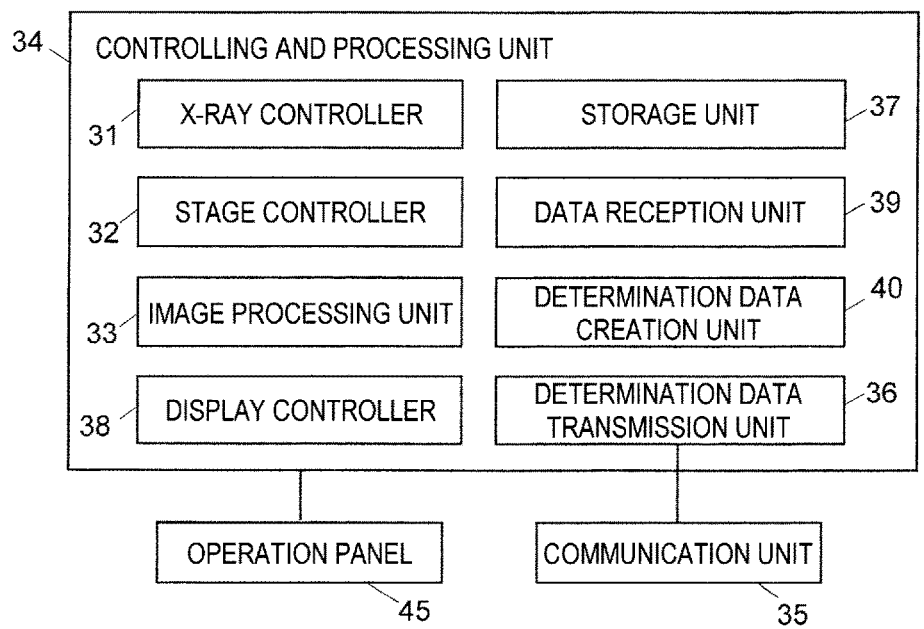
FIG. 4 is a block diagram illustrating a functional configuration of a controlling and processing unit.
Figure 5:
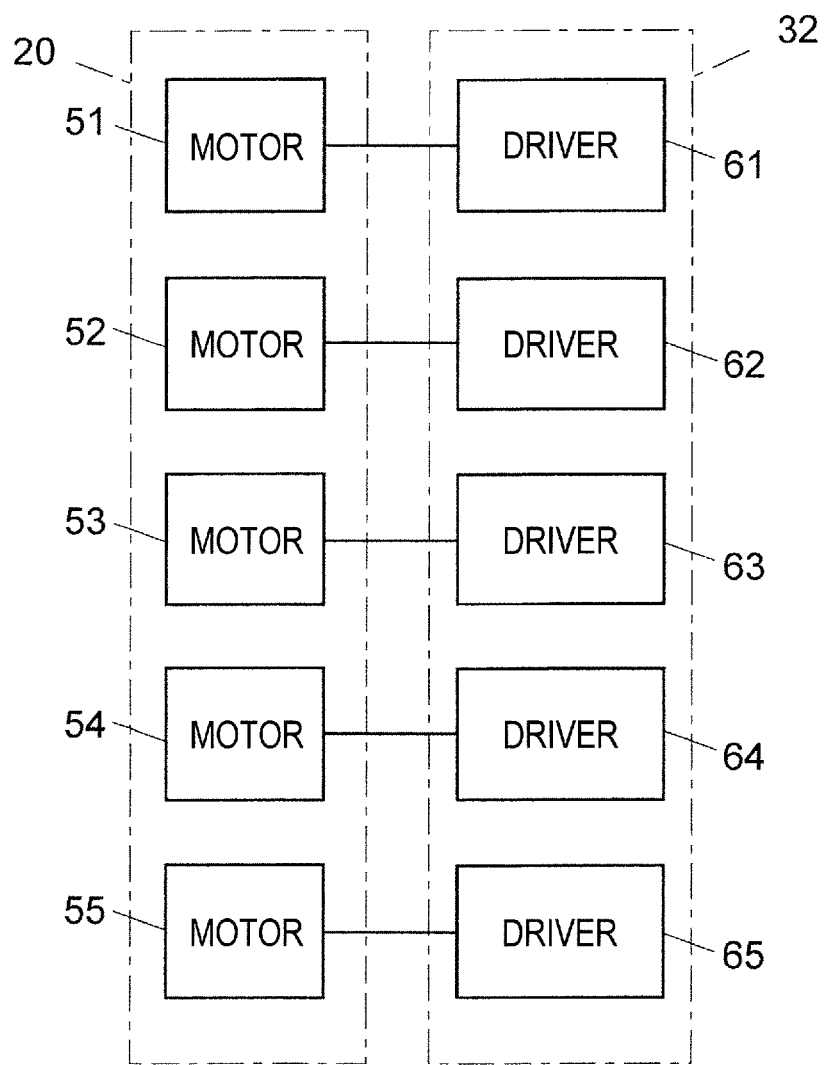
FIG. 5 is a block diagram illustrating a functional configuration of a moving mechanism controller.

Next, the control device 30 will be described with reference to FIGS. 3 to 5. The control device 30 includes a controlling and processing unit 34, and a communication unit 35 for conducting communication via the Internet 110, which is a communication network. The controlling and processing unit 34 is for controlling the operation of the entire X-ray CT device, and detection signals of the X-ray detector 12 and the microswitch 13 are input into the controlling and processing unit 34. An operation signal of the operation panel 45 is also input into the controlling and processing unit 34. In addition to a storage unit 37, the controlling and processing unit 34 includes, as a control block, an X-ray controller 31, a stage controller 32, an image processing unit 33, a display controller 38, a data reception unit 39, a determination data creation unit 40, and a determination data transmission unit 36.

The X-ray controller 31 controls a tube voltage and a tube current supplied to an X-ray tube in the X-ray source 11 in accordance with a material of the workpiece and an X-ray transmission characteristic.

The stage controller 32 includes drivers 61 to 65 (see FIG. 5) respectively connected with the motors 51 to 55 included in the moving mechanism 20, and controls the motors 51 to 55 via the drivers 61 to 65. In the present embodiment, by operating the operation panel 45, the rotation speeds of the motors 51 to 55 (that is, the moving speed of the base 24, the moving speeds of the X stage 23 and the Y stage 22, the rotating speed of the rotating stage 21, and the moving speeds of the X stage 23, the Y stage 22, and the rotating stage 21 in Z direction) are configured to be selectable. The stage controller 32 controls the motors 51 to 55, based on an operation signal from the operation panel 45.

The image processing unit 33 creates X-ray image data based on the detection signals of the X-ray detector 12. In addition, the image processing unit 33 performs appropriate image processing on the X-ray image data that has been obtained, so as to be capable of constructing, for example, a tomographic image obtained by slicing the workpiece on the rotating stage 21 along an X-Y plane.

The display controller 38 controls displaying of a liquid crystal display included in the operation panel 45.

The data reception unit 39 receives the detection signals of the microswitch 13 that have been input into the controlling and processing unit 34. In addition, the data reception unit 39 receives time data (driving time data), in which the drivers 61 to 65 respectively drives the motors 51 to 55, from the stage controller 32.

The determination data creation unit 40 creates data indicating the number of times of opening and closing the doors 41 and 42 (data of the number of times of opening and closing) and data indicating an operating situation of the moving mechanism 20 (operating situation data), from the detection signals of the microswitch 13, the driving time data of the motors 51 to 55, and the operation signal of the operation panel 45, which have been received by the data reception unit 39. Hereinafter, these data are collectively referred to as determination data, in some cases. In the present embodiment, the data reception unit 39 and the determination data creation unit 40 constitute a data acquisition unit. In addition, the determination data corresponds to consumption determination data in the present invention.

The determination data transmission unit 36 (corresponding to a data transmission unit in the present invention) outputs the determination data that has been created by the determination data creation unit 40 to the Internet 110 via the communication unit 35.

The entity of the controlling and processing unit 34 is a general personal computer, and each functional block described above is embodied by a processor executing software installed beforehand.

Figure 6:
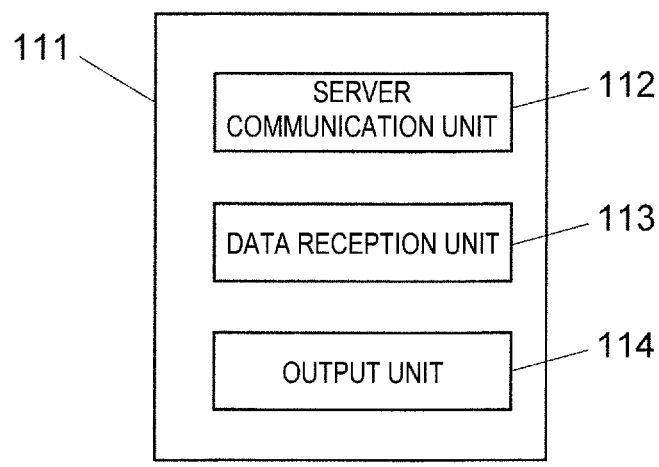
FIG. 6 is a block diagram illustrating a functional configuration of a management server.

FIG. 6 is a block diagram illustrating a functional configuration of a management server 111.

The management server 111 includes a server communication unit 112 connectable with the Internet 110, a data reception unit 113 that receives the determination data output from the determination data transmission unit 36 of the X-ray inspection device into the Internet 110 via the server communication unit 112, and an output unit 114 that outputs a message for prompting the replacement of the component parts of the moving mechanism 20 and the doors 41 and 42 of the X-ray inspection device at an appropriate timing based on the determination data.

Next, a management method for the X-ray CT device by using the management server 111 will be described.

In the X-ray CT device having the above-described configuration, when the workpiece is loaded into the casing 10 in order to perform the CT imaging for the workpiece or when the workpiece for which the CT imaging is finished is unloaded from the casing 10, a user grips the handle 43 and moves the doors 41 and 42 in the closed state to the left to open the entrance. As a result, the right end face of the door 41 is separated from the microswitch 13, and the contact of the microswitch 13 turns off.

After the workpiece is placed on the rotating stage 21 or after the workpiece is taken out of the rotating stage 21, the doors 41 and 42 are moved to the right to close the entrance. As a result, the right end face of the door 41 comes into contact with the microswitch 13, and the contact of the microswitch 13 turns on. The detection signals (ON signal and OFF signal) of the microswitch 13 are input into the controlling and processing unit 34, and the data reception unit 39 receives the detection signals. Whenever the data reception unit 39 receives the detection signals of the microswitch 13, the determination data creation unit 40 counts the number of times of opening and closing the doors 41 and 42, and creates data of the number of times of opening and closing obtained by adding "1" to the previous number of times of opening and closing.

In the present embodiment, the determination data creation unit 40 does not count the number of times of opening and closing, in a case where a period from the time when an OFF signal is input from the microswitch 13 to the time when an ON signal is input next is shorter than a predetermined period. This configuration enables the prevention of an unintended action of opening and closing the doors 41 and 42 from being counted as the number of opening and closing times, such as when the user accidentally touches the handle 43 or when the doors 41 and 42 slightly move to the left due to some external force.

Further, in performing the X-ray CT imaging of the workpiece placed on the rotating stage 21, the stage controller 32 controls the drivers 61 to 65 in accordance with the operation signal of the operation panel 45 that has been input into the controlling and processing unit 34. Accordingly, the motors 51 to 55 rotate at the rotation speed and the movement speed that have been set on the operation panel 45. As a result, the base 24, the X stage 23, the Y stage 22, and the rotating stage 21 move.

In this situation, the data reception unit 39 receives the driving time data of the motors 51 to 55 and the operation signal of the operation panel 45 from the stage controller 32. The determination data creation unit 40 creates data indicating the operating situation of the moving mechanism 20 from the driving time data of the motors and the operation signal that have been received by the data reception unit 39. Specifically, for example, three speed stages of V1 (slow), V2 (normal), and V3 (fast) are set as the moving speeds of the X stage 23. In a case where an operation time T1 is set for a moving speed V1, an operation time T2 is set for a moving speed V2, and an operation time T3 is set for a moving speed V3, an abrasion degree is generally larger when the X stage 23 moves at a higher speed. Therefore, values A1, A2, and A3 are respectively defined as weightings of the abrasion degrees at the speeds V1, V2, and V3, and data of the operating situation as follows is generated.

$$L0 = (A1 \times V1 \times T1) + (A2 \times V2 \times T2) + (A3 \times V3 \times T3) \quad (1)$$

For example, assuming that V1=1 cm/sec, V2=5 cm/sec, V3=10 cm/sec, T1=10 sec, T2=2 sec, and T3=1 sec, and in a case where the weightings of A1, A2, and A3 are not adopted in an expression (1), the data of the operating situation L0 is a value (=30) of the sum of L1 to L3 described below.

$$L1 = V1 \times T1 = 1 \times 10 = 10$$

$$L2 = V2 \times T2 = 5 \times 2 = 10$$

$$L3 = V3 \times T3 = 10 \times 1 = 10$$

However, in a case where the weightings of A1=1, A2=3, and A3=10 are applied, the values of L1 to L3 are different, as described below, from those in the case where the above-described weightings are not applied.

$$L1 = A1 \times V1 \times T1 = 1 \times 1 \times 10 = 10$$

$$L2 = A2 \times V2 \times T2 = 3 \times 5 \times 2 = 30$$

$$L3 = A3 \times V3 \times T3 = 10 \times 10 \times 1 = 100$$

Therefore, different results are obtainable as the value of L0, which is the sum of L1 to L3. Here, the X stage 23 has been described, but similar weighting is applicable to the Y stage 22, the rotating stage 21, the guide rails 25, and the like.

The data of the number of times of opening and closing the doors 41 and 42 and the operating situation data (the determination data) of the moving mechanism 20 that have been created by the determination data creation unit 40 as described above are output from the determination data transmission unit 36 to the Internet 110 via the communication unit 35. When the determination data is output to the Internet 110, the data reception unit 113 of the management server 111 receives the determination data via the server communication unit 112. When the data reception unit 113 receives the determination data, the output unit 114 creates and outputs a message signal for prompting the replacement of the component parts of the moving mechanism 20 and the component parts of the doors 41 and 42 (for example, the microswitch 13 and the shock absorber 46 for shock absorption), based on the determination data. For example, in a case where the determination data is the data of the number of times of opening and closing the doors 41 and 42, a message signal for prompting the replacement of the component parts of the doors 41 and 42 (for example, the microswitch 13 and the shock absorber 46 for shock absorption) is created, based on the fact that the number of times of opening and closing exceeds a predetermined value. In addition, in a case where the determination data is the operating situation data of the moving mechanism 20, a message signal for prompting the replacement of the component parts of the moving mechanism 20 is created, based on the fact that a stage load amount L0 exceeds a predetermined value.

The message signal may be an audio signal or an image signal representing a character, a symbol, or the like to be displayed on a display unit, not illustrated. In addition, the output unit 114 of the management server 111 may output a message signal to the controlling and processing unit 34 of the X-ray CT device via the server communication unit 112 and the Internet 110. In this case, the controlling and processing unit 34, into which the message signal from the management server 111 is input, displays a message for prompting the replacement on the operation panel 45.

The output unit 114 may output the message signal not only at the timing of replacing the component parts or the like of the moving mechanism 20 but also at a timing earlier by a predetermined time than the time of replacement. By outputting the message signal at a timing earlier by a predetermined time than the replacement timing, procurement of the component parts for replacement is enabled in preparation for the arrival of the replacement timing.

In the above embodiment, the data indicating the operating situation of the moving mechanism 20 is one piece of the determination data. However, the data indicating the operating situation of a driving system other than the moving mechanism 20, for example, a moving mechanism of an aging cover 63 or a shutter 62 (which are each indicated by a two-dot chain line in FIG. 3) to be used in an aging work performed before the inspection at the operation start of the X-ray inspection device can be added to the determination data.

Further, the determination data from the X-ray inspection device to the management server 111 may be transmitted, whenever the data is created, or may be transmitted every certain time, every certain number of times, or every certain condition. For example, in the case of the data of the number of times of opening and closing, such data may be transmitted whenever an action of opening and closing the doors 41 and 42 is conducted. In addition, in a case of the operating situation data of the moving mechanism 20, the operating situation data may be transmitted whenever the workpiece is subject to the CT imaging.

In the above-described embodiment, the operation panel 45 of a touch panel type is adopted, but an operation panel of a mouse operation type may be adopted.

It is understood by those skilled in the art that the exemplary embodiments described above are specific examples of the following aspects.

(First aspect) An X-ray inspection device according to one aspect of the present invention includes:

a casing including an entrance of an object to be inspected, and a door for opening and closing the entrance;

a stage on which the object is placed, an X-ray source configured to emit an X-ray, and an X-ray detector configured to detect the X-ray that has been emitted from the X-ray source and transmitted through the object placed on the stage, the stage, the X-ray source, and the X-ray detector being accommodated inside the casing;

a driving system including a moving mechanism of the stage;

a communication unit connectable with a communication network;

a data acquisition unit configured to acquire consumption determination data including at least one of data indicating an operating situation of the driving system or data indicating the number of times of opening and closing the door; and a data transmission unit configured to output the consumption determination data that has been acquired by the data acquisition unit to the communication network via the communication unit.

(Fourth aspect) A management server for managing the X-ray inspection device according to the present invention is configured to manage the above-described X-ray inspection device, the management server including:

a server communication unit connectable with a communication network; and a data reception unit configured to receive, via the server communication unit, consumption determination data transmitted from the X-ray inspection device through the communication network.

(Sixth aspect) A management method according to the present invention is a management server for managing a situation of the X-ray inspection device, using a management server connected with a communication network, the management method comprising:

requesting from the management server to the X-ray inspection device for a transmission of consumption determination data through the communication network; and receiving the consumption determination data transmitted from the X-ray inspection device to the management server through the communication network.

According to the present invention, the consumption determination data that has been acquired by the data acquisition unit of the X-ray inspection device can be managed by the management server connected with the X-ray inspection device through the communication network. The consumption determination data includes at least one of the data indicating the operating situation of the driving system of the X-ray inspection device and the data indicating the number of times of opening and closing the door, so that the situation of use of the driving system of the X-ray inspection device or the door can accurately be grasped from the consumption determination data.

(Second aspect) The X-ray inspection device in a second aspect is the X-ray inspection device described in the first aspect, in which the data indicating the operating situation of the driving system includes data indicating a moving situation of the stage.

According to the X-ray inspection device in the second aspect, the situation of use of the stage of the X-ray inspection device can be grasped.

(Third aspect) The X-ray inspection apparatus in a third aspect is the X-ray inspection apparatus described in the second aspect, in which the data indicating the moving situation of the stage includes information regarding at least one of a moving time of the stage, a moving speed of the stage, a moving distance of the stage, or a weighting in accordance with the moving speed.

According to the X-ray inspection device in the third aspect, the situation of use of the stage can be grasped in a more accurate manner.

(Fifth aspect) The management server in a fifth aspect of the X-ray inspection device is the X-ray inspection device described in the fourth aspect, the management server further comprising an output unit configured to output a message for prompting at least one of a replacement of a driving system of the X-ray inspection device or a replacement of a component part of the door, based on the consumption determination data that has been received by the data reception unit.

According to the management server of the X-ray inspection device in the fifth aspect, the fact that the replacement of the driving system of the X-ray inspection device and the replacement of the component parts of the door are necessary can be recognized with ease.

The above description has been made for the description of the embodiments of the present invention, and does not limit the present invention.

REFERENCE SIGNS LIST

100 . . . Device Main Body
10 . . . Casing
11 . . . X-ray Source
12 . . . X-ray Detector
13 . . . Microswitch
20 . . . Moving Mechanism
21 . . . Rotating Stage
22 . . . Y Stage
23 . . . X Stage
24 . . . Base
30 . . . Control Device
31 . . . X-ray Controller
32 . . . Stage Controller
33 . . . Image Processing Unit
34 . . . Controlling And Processing Unit
35 . . . Communication Unit
36 . . . Determination Data Transmission Unit
37 . . . Storage Unit
38 . . . Display Controller
39 . . . Data Reception Unit
40 . . . Determination Data Creation Unit
41,42 Door
45 . . . Operation Panel
46 . . . Shock Absorber
110 . . . Internet
111 . . . Management Server
112 . . . Server Communication Unit
113 . . . Data Reception Unit
114 . . . Output Unit

The invention claimed is:

1. An X-ray inspection device comprising:
a casing including an entrance of an object to be inspected, and a door for opening and closing the entrance;
a stage on which the object is placed, an X-ray source configured to emit an X-ray, and an X-ray detector configured to detect the X-ray that has been emitted from the X-ray source and transmitted through the object placed on the stage, the stage, the X-ray source, and the X-ray detector being accommodated inside the casing;
a moving mechanism of the stage, the moving mechanism including a motor; and
a controlling and processing unit, wherein:
the controlling and processing unit receives a driving time data of the motors, and creates data indicating an operating situation of the moving mechanism, and outputs the data indicating the operating situation of the moving mechanism via a network.

2. The X-ray inspection device according to claim 1, wherein the data indicating the operating situation of the moving mechanism includes data indicating a moving situation of the stage.

3. The X-ray inspection device according to claim 2, wherein the data indicating the moving situation of the stage includes information regarding at least one of a moving time of the stage, a moving speed of the stage, a moving distance of the stage, or a weighting in accordance with the moving speed.

4. A management server configured to manage the X-ray inspection device of claim 1,
wherein the management server is configured to receive data indicating the operating situation of a moving mechanism of a stage transmitted from the X-ray inspection device through a communication network.

5. The management server according to claim 4,
wherein the management server is configured to output a message for prompting at least one of a replacement of the moving mechanism of the X-ray inspection device, based on the data indicating the operating situation of the moving mechanism.

6. A management method for managing a situation of the X-ray inspection device of claim 1, using a management server connected with a communication network, the management method comprising:
requesting from the management server to the X-ray inspection device for a transmission of data indicating the operating situation of the moving mechanism through the communication network; and
receiving the data indicating the operating situation of the moving mechanism transmitted from the X-ray inspection device to the management server through the communication network.

7. An X-ray inspection device comprising:
a casing including an entrance of an object to be inspected, and a door for opening and closing the entrance;
a switch or a sensor for detecting an action of opening and closing the door;
a controlling and processing unit; and
a stage on which the object is placed, an X-ray source configured to emit an X-ray, and an X-ray detector configured to detect the X-ray that has been emitted from the X-ray source and transmitted through the object placed on the stage, the stage, the X-ray source, and the X-ray detector being accommodated inside the casing, wherein:
the controlling and processing unit receives detection signals of the switch or the sensor, and creates data indicating number of times of opening and closing the door, and outputs the data indicating the number of times of opening and closing the door via a network.

8. A management server configured to manage the X-ray inspection device of claim 7,
wherein the management server is configured to receive data indicating the number of times of opening and closing the door transmitted from the X-ray inspection device through a communication network.

9. The management server according to claim 8,
wherein the management server is configured to output a message for prompting a replacement of a component part of the door, based on the data indicating the number of times of opening and closing the door.

10. A management method for managing a situation of the X-ray inspection device of claim 7, using a management server connected with a communication network, the management method comprising:
requesting from the management server to the X-ray inspection device for a transmission of data indicating the number of times of opening and closing the door through the communication network; and
receiving the data indicating the number of times of opening and closing the door transmitted from the X-ray inspection device to the management server through the communication network.

* * * * *